United States Patent
Kitagawa

(10) Patent No.: US 9,895,869 B2
(45) Date of Patent: *Feb. 20, 2018

(54) SHEET MATERIAL ADHESIVE AGENT APPLICATION METHOD

(71) Applicant: NISSAN MOTOR CO., LTD., Yokohama-shi, Kanagawa (JP)

(72) Inventor: Shinichiro Kitagawa, Atsugi (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 297 days.

This patent is subject to a terminal disclaimer.

(21) Appl. No.: 14/673,076

(22) Filed: Mar. 30, 2015

(65) Prior Publication Data
US 2015/0202654 A1 Jul. 23, 2015

Related U.S. Application Data

(62) Division of application No. 14/424,319, filed as application No. PCT/JP2013/070696 on Jul. 31, 2013, now Pat. No. 9,278,513.

(30) Foreign Application Priority Data

Aug. 27, 2012 (JP) .................................. 2012-185997

(51) Int. Cl.
*C09J 5/00* (2006.01)
*B32B 38/18* (2006.01)
(Continued)

(52) U.S. Cl.
CPC ............. *B32B 38/18* (2013.01); *B05D 1/02* (2013.01); *B05D 5/00* (2013.01); *B32B 37/1284* (2013.01);
(Continued)

(58) Field of Classification Search
CPC ............................ B32B 37/1284; B32B 38/18
See application file for complete search history.

(56) References Cited

U.S. PATENT DOCUMENTS

| 3,639,194 A * | 2/1972 | Plunkett .................. B32B 37/22 156/464 |
| 2002/0064629 A1* | 5/2002 | Yoshii .................... B31D 3/007 428/184 |
| 2003/0047863 A1 | 3/2003 | Lang et al. |

FOREIGN PATENT DOCUMENTS

| EP | 1 043 796 A1 | 10/2000 |
| JP | 02-080642 U | 6/1990 |

(Continued)

*Primary Examiner* — Xiao S Zhao
(74) *Attorney, Agent, or Firm* — Foley & Lardner LLP

(57) ABSTRACT

A sheet material adhesive agent application method includes first and second actions. The first action is performed sequentially for stacked multiple sheet materials. The first action is implemented by: taking out an uppermost one of the multiple sheet materials; transferring the taken-out sheet material to an adhesive agent application stage; and applying the adhesive agent to the transferred sheet material at the adhesive agent application stage. The second action is performed in advance to the first action, wherein the second action is implemented by setting an uppermost group of sheet materials so that each sheet material of the uppermost group has a predetermined curvature projecting upward. The first action is completed before the sheet material is restored to a state before the second action.

10 Claims, 5 Drawing Sheets

(51) Int. Cl.
*B65H 1/18* (2006.01)
*B65H 3/54* (2006.01)
*B65H 1/14* (2006.01)
*B65H 3/08* (2006.01)
*B65H 3/56* (2006.01)
*B65H 5/10* (2006.01)
*H01M 10/04* (2006.01)
*B05D 1/02* (2006.01)
*B05D 5/00* (2006.01)
*B32B 37/12* (2006.01)
*H01M 10/052* (2010.01)

(52) U.S. Cl.
CPC ................. *B65H 1/14* (2013.01); *B65H 1/18* (2013.01); *B65H 3/08* (2013.01); *B65H 3/0816* (2013.01); *B65H 3/54* (2013.01); *B65H 3/56* (2013.01); *B65H 5/10* (2013.01); *H01M 10/049* (2013.01); *H01M 10/0413* (2013.01); *B65H 2301/51212* (2013.01); *B65H 2405/1142* (2013.01); *H01M 10/052* (2013.01)

(56) References Cited

FOREIGN PATENT DOCUMENTS

| | | |
|---|---|---|
| JP | 2000-168976 A | 6/2000 |
| JP | 2004-142917 A | 5/2004 |
| JP | 2005-311557 A | 11/2005 |
| JP | 2010-247912 A | 11/2010 |

* cited by examiner

3A --- SHEET MATERIAL STOCKER
7 --- CASE
1 --- LIFTER TABLE
18 --- GATE BLOCK
18a --- INCLINED SURFACE
W --- SHEET MATERIAL

SHEET MATERIAL ADHESIVE AGENT APPLICATION METHOD

CROSS REFERENCE TO RELATED APPLICATIONS

This application is a divisional of U.S. application Ser. No. 14/424,319, filed Feb. 26, 2015, which is the National Stage of Application No. PCT/JP2013/070696 filed on Jul. 31, 2013, which claims benefit of priority from the prior Japanese Application No. 2012-185997, filed Aug. 27, 2012, the entire contents of all of which are incorporated herein by reference.

TECHNICAL FIELD

The present invention relates generally to a sheet material adhesive agent application method.

BACKGROUND ART

As is commonly known, when an uppermost one of multiple sheet materials stacked in a stocker is taken out sequentially, there is a request to prevent that two sheet materials are taken out simultaneously (i.e. double take-out of sheet materials). For example, a patent document 1 discloses a sheet material transfer device including a tool for preventing double take-out of sheet materials.

According to a technique described in patent document 1, a tool for preventing double take-out of sheet materials is provided which includes a hole slightly smaller than target sheets, and when a sheet is taken out from a stocker by a sheet take-out means, edge parts of the sheet is bent downwardly by passing the sheet through the tool. According to this method, it is said that the sheet materials can be reliably taken out one by one by leaving the uppermost sheet only and separating the other sheets by the sheet take-out means when two or more of the target sheet materials are stacked.

However, even if the technique described in patent document 1 can be applied to a flexible sheet such as paper or cloth, there is room for improvement because it is difficult to pass the sheet through the tool for preventing double take-out in a case of a relatively high rigidity sheet such as a resin sheet.

PRIOR ART DOCUMENT(S)

Patent Document(s)

Patent Document 1: Japanese Patent Application Publication No. 2000-168976.

SUMMARY OF THE INVENTION

It is an object of the present invention to provide a sheet material adhesive agent application method which can cancel an adverse effect of warpage of a sheet material, and thereby enhance the quality and stability of adhesive agent application.

According to one aspect of the invention, a sheet material adhesive agent application method comprises:
performing a first action including applying an adhesive agent to a sheet material; and performing a second action in advance to the first action, wherein the second action includes setting the sheet material so that the sheet material has a predetermined curvature; and wherein the first action is completed before the sheet material is restored to a state before the second action.

MODE(S) FOR CARRYING OUT THE INVENTION

Figure 1:
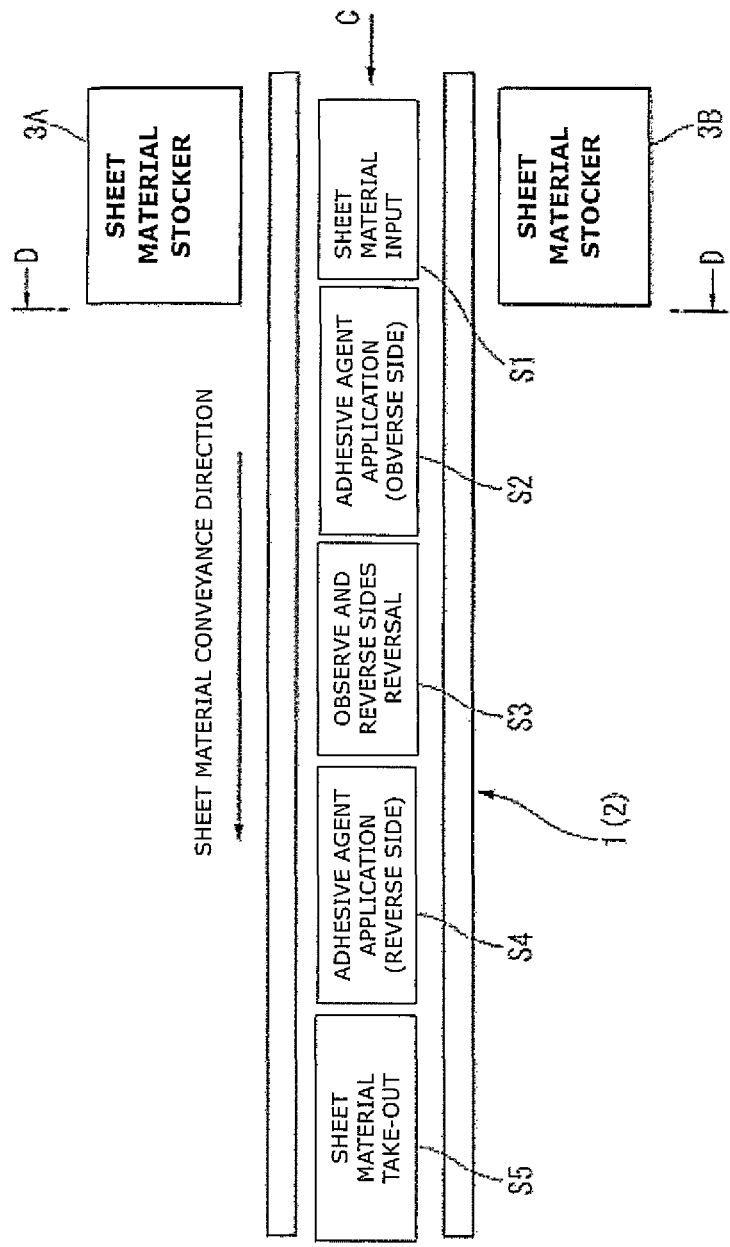
FIG. 1 is a plan diagram showing schematic configuration of an adhesive agent application line which employs a sheet material adhesive agent application.

The drawings of FIGS. 1 to 5 show specific embodiments of a sheet material adhesive agent application method according to the present invention. FIG. 1 shows a schematic plan view of a line for applying an adhesive agent to sheet materials.

For example, the sheet material is made of resin such as PP (polypropylene), and has a rectangular shape, and has a thickness of about 1 millimeter, and has a property of electrical insulation. In this embodiment, it is assumed that the sheet material is used as an insulation sheet, when multiple cells are accommodated in a metallic hard case, and modularized to form a module of a lithium-ion secondary battery, wherein each cell has a thin laminated structure. The sheet material which functions as the insulation sheet is interposed by adhesive bonding between the cells and the hard case in the lithium-ion secondary battery in order to prevent direct contact therebetween. Accordingly, it is necessary to apply the adhesive agent to both surfaces of the sheet material in advance under a condition that the sheet material is separated. FIG. 1 shows schematically an adhesive agent application line.

As shown in FIG. 1, an adhesive agent application line 1 is based on a conveyor 2, including a sheet material input stage S1, an adhesive agent application stage (obverse side) S2, an obverse and reverse side reversal stage S3, an adhesive agent application stage (reverse side) S4, and a sheet material take-out stage S5, which are arranged from a starting end side. The sheet materials are conveyed sequentially in a direction from the starting end side to a terminal end side, wherein each sheet material is positioned and placed on a pallet not shown.

Moreover, sheet material stockers 3A and 3B are provided on respective sides of sheet material input stage S1. Multiple predetermined sheet materials are stacked in each sheet material stocker 3A, 3B. As described below, one of the sheet materials stacked in sheet material stocker 3A or 3B is taken out sequentially by a sheet material take-out means, and then the taken-out sheet material is positioned and input on a pallet on standby at sheet material input stage S1.

Figure 2:
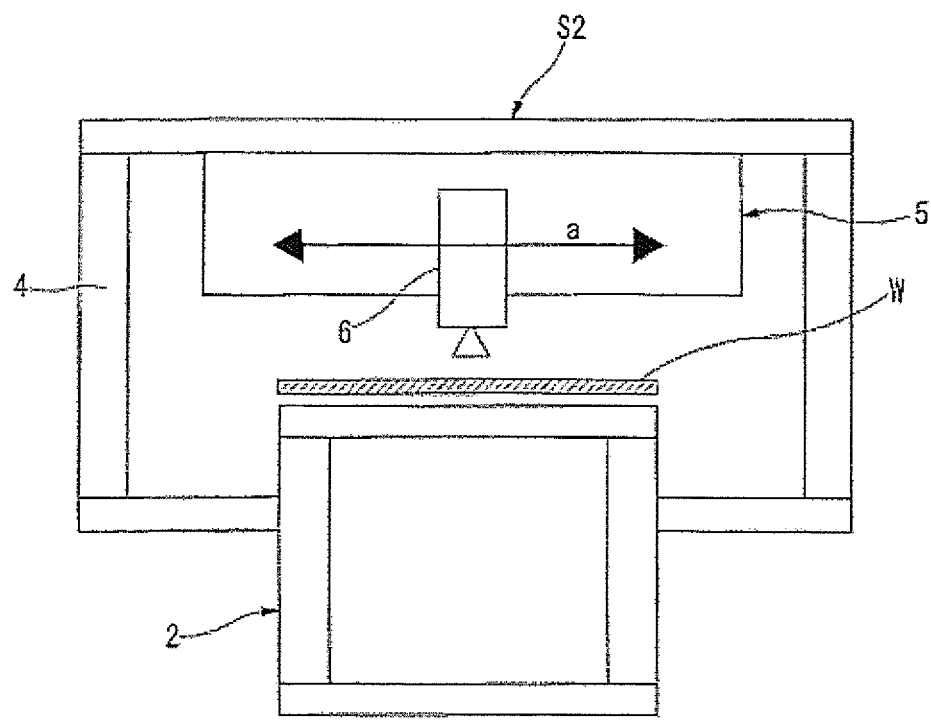
FIG. 2 is an enlarged diagram viewed in a direction indicated by an arrow D in FIG. 1.

FIG. 2 shows a diagram viewed in a direction indicated by an arrow D in FIG. 1. As shown in FIG. 2, adhesive agent application stage S2 is provided with an adhesive agent application apparatus 5 through a gate type frame 4 above conveyor 2. In synchronization with continuous conveyance of sheet materials by conveyor 2, an application gun 6 of adhesive agent application apparatus 5 reciprocates (i.e. oscillating movement) in a width direction of conveyor 2 indicated by an arrow "a" (in a direction perpendicular to a conveyance direction of the conveyor), and sprays the adhesive agent to apply the adhesive agent to an entire surface of sheet material W which is placed on the pallet provided at conveyor 2.

This mechanism of adhesive agent application is also employed by the later adhesive agent application stage S4. At the prior adhesive agent application stage S2, the adhesive agent is applied to an obverse side of sheet material W. At obverse and reverse side reversal stage S3, sheet material W is reversed by a reversing means not shown, and then sheet material W is conveyed to the later adhesive agent application stage S4. At adhesive agent application stage S4, the adhesive agent is applied also to a reverse side of sheet material W.

Moreover, sheet material W whose obverse and reverse sides are applied with the adhesive agent is conveyed to sheet material take-out stage S5 and is taken out, and then sheet material W is input into a later stage for assembling a module of lithium-ion secondary battery.

Figure 3:
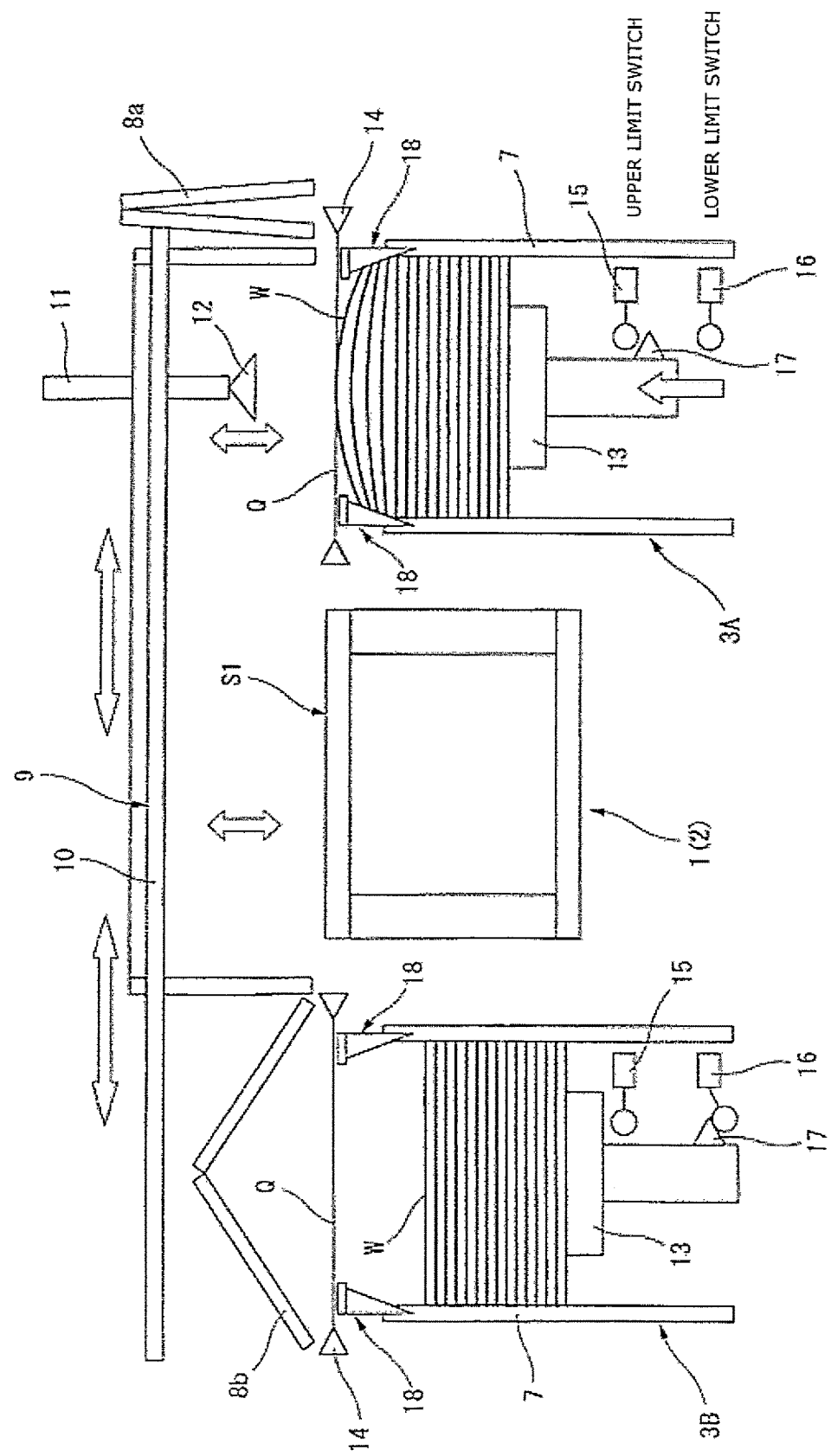
FIG. 3 is an enlarged diagram viewed in a direction indicated by an arrow C in FIG. 1.
Figure 4:
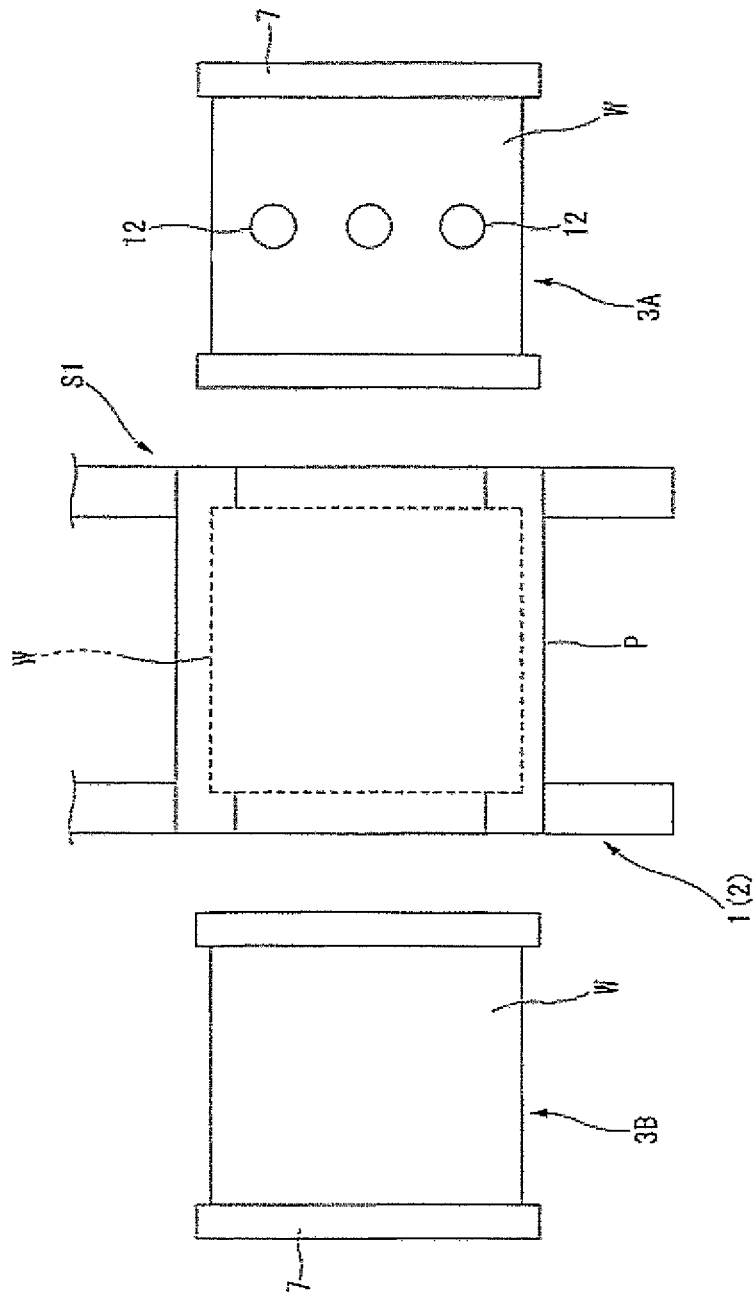
FIG. 4 is a plan diagram of FIG. 3.

FIG. 3 is a diagram viewed in a direction indicated by an arrow C in FIG. 1, and FIG. 4 is a plan diagram of FIG. 3.

As shown in FIGS. 3 and 4, sheet material stockers 3A and 3B are disposed on respective sides of sheet material input stage S1, and multiple sheet materials W are stacked in a case of each of stockers 3A and 3B under a condition that sheet materials W are aligned at four sides.

In this embodiment, both sheet material stockers 3A and 3B are not operated simultaneously. Under conditions that only a very few sheet materials W are left in sheet material stocker 3A or 3B, or sheet material stocker 3A or 3B is brought into an empty state by taking out all of sheet materials W, the taking-out operation is switched so as to take out sheet materials W in the other sheet material stocker 3B or 3A. While sheet materials W in the sheet material stocker 3B or 3A are being taken out, the other sheet material stocker 3A or 3B in the empty state is replenished with sheet materials W.

With regard to the sheet material stocker in operation, which is the right-side sheet material stocker 3A in the situation of FIG. 3, a stocker cover 8a located above sheet material stocker 3A is opened in order to allow to take out sheet materials W in sheet material stocker 3A from above. On the other hand, with regard to the left-side sheet material stocker 3B in the situation of FIG. 3 which is not being operated, a stocker cover 8b is closed for safety measures such as replenishment operation of sheet materials W. In this way, both sheet material stockers 3A and 3B are not used in operation simultaneously, but are used one by one alternately.

Moreover, a transfer device 9 is disposed so as to extend between sheet material stockers 3A and 3B above sheet material input stage S1. Transfer device 9 is configured to allow a transfer head 11 to travel along a frame 10, wherein transfer head 11 is a sheet material take-out means, and is provided with a plurality of vacuum pads (vacuum cups) 12 each of which is configured to move in a vertical direction. For example, in response to a condition that transfer head 11 is located just above sheet material stocker 3A, vacuum pads 12 are moved downward to suck and support the uppermost sheet material W in sheet material stocker 3A. In response to a condition that vacuum pads 12 are sucking and supporting the sheet material W, transfer head 11 moves vacuum pads 12 upwardly together with the sucked and supported sheet material W, and then travels to a position just above sheet material input stage S1 on conveyer 2. In response to a condition that transfer head 11 has traveled to the position just above sheet material input stage S1, transfer head 11 moves vacuum pads 12 downwardly together with the sucked and supported sheet material W, and cancel negative pressure of each vacuum pad 12, so that sheet material W is released from vacuum pads 12, and positioned and placed on pallet P on standby at sheet material input stage S1. Then, transfer head 11 travels again to the position just above sheet material stocker 3A, and thereafter performs the above operation repeatedly.

As mentioned above, each of sheet material stockers 3A and 3B includes a case 7, which has a rectangular shape in a planar view, wherein multiple sheet materials W are stacked in case 7 under the condition that sheet materials W are aligned at four sides therearound. The entire stacked sheet materials W are supported by a lifter table 13 which is configured to be lifted up by a motor not shown. Furthermore, lifter table 13 performs lift-up operation intermittently and controls a height position of the entire stacked sheet materials W so that the uppermost sheet material W of the stacked multiple sheet materials W is set constantly at a constant height such that the uppermost sheet material W is taken out.

More specifically, each of sheet material stockers 3A and 3B is provided with a non-contact seating sensor 14 and limit switches 15 and 16, wherein non-contact seating sensor 14 detects the height position of the uppermost sheet material W (i.e. detects that the uppermost sheet material W is set at the height where the uppermost sheet material W is taken out), and wherein limit switches 15 and 16 manage an upward movement limit position and a downward movement limit position of lifter table 13. These limit switches 15 and 16 are ON/OFF-operated by a dog 17 which is attached to lifter table 13. Seating sensor 14 is implemented by a photoelectric sensor or a laser sensor.

Moreover, when the uppermost sheet material W is taken out by transfer head 11, there are no object which blocks an optical axis Q of seating sensor 14, so that lift-up operation of lifter table 13 is performed in response to OFF-operation of seating sensor 14. When lifter table 13 and the entire stacked sheet materials W are lifted up, and the following sheet material W is brought into a position where the optical axis Q of seating sensor 14 is blocked (Le. the height where the uppermost sheet material W is taken out), lift-up operation of lifter table 13 is stopped in response to a condition that seating sensor 14 is ON-operated immediately. The intermittent lift-up operation is performed repeatedly in sheet material stocker 3A or 3B in synchronization with the operation of taking-out sheet material W by transfer head 11, so that the uppermost sheet material W of the stacked sheet materials W is always positioned at the predetermined height where the uppermost sheet material W is taken out.

When limit switch 15 is ON-operated while the above lift-up operation is performed repeatedly, it indicates an empty condition that there are no sheet materials W on lifter table 13, or there are only a few sheet materials W on lifter table 13. Accordingly, in response to the condition that limit switch 15 is ON-operated, lifter table 13 is lowered at once, and stopped in a position where the other limit switch 16 is ON-operated. In this timing, the sheet material stocker where sheet materials W should be taken out is switched from sheet material stocker 3A to sheet material stocker 3B. Thereafter, the taking-out operation is continued for sheet materials W in sheet material stocker 3B similar to the above operation in sheet material stocker 3A, and replenishment operation of sheet materials W is performed by an operator for sheet material stocker 3A in the empty condition that there are no sheet material W.

In this embodiment, case 7 of each sheet material stocker 3A, 3B is provided with gate blocks 18 and 18 which serve as a mechanism for giving curvature for preventing for double take-out of sheet materials W. As mentioned above, case 7 of each sheet material stocker 3A, 3B has a rectangular shape in the planar view in order to stack and store sheet materials W under the condition that sheet materials W are aligned at four sides therearound.

Figure 5:
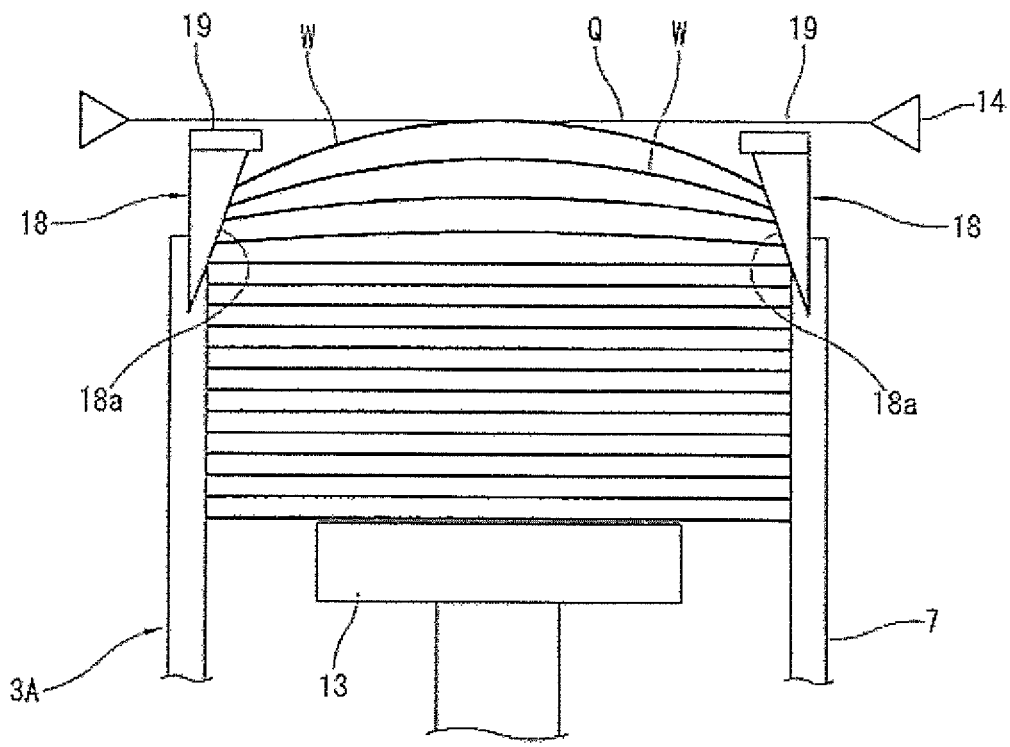
FIG. 5 is a partially enlarged diagram of FIG. 3.

In the embodiment, as shown in FIG. 3, and FIG. 5 which is a partially enlarged diagram of FIG. 3, wedged gate blocks 18 and 18 are disposed to face each other on respective inner wall surfaces of an upper end part of case 7 in which multiple sheet materials W are stacked, so that inner wall surfaces of the upper end part of case 7 facing two opposite sides of sheet material W gradually approaches each other as followed in an upward direction of case 7. Each of the inner wall surfaces is implemented by an inclined surface 18*a* so that the distance between the inner wall surfaces of the upper end part of case 7 facing two opposite sides of sheet material W gradually becomes small in the upward direction of case 7. Each gate block 18 is provided with a top plate 19 on an upper surface thereof, so that the space between top plates 19 and 19 is a minimum dimension part through which sheet materials W can be passed.

With sheet material stockers 3A and 3B configured as described above, when the uppermost one of the sheet materials W stacked in case 7 is located at the take-out height where the uppermost sheet material W is detected by seating sensor 14, not only opposite sides of the uppermost sheet material W but also opposite sides of an uppermost group of sheet materials W including the uppermost sheet material W are necessarily in contact with inclined surfaces 18*a* and 18*a* of gate blocks 18 and 18.

As mentioned above, the configuration that gate blocks 18 and 18 are disposed to face each other at the upper end part of case 7, results in that the distance between inner wall surfaces of the upper end part of case 7 facing two opposite sides of sheet materials W is gradually reduced in the upward direction by inclined surfaces 18*a* and 18*a*.

Therefore, the uppermost group of sheet materials W including the uppermost sheet material W are curved so as to project upward by its own elasticity, so that each sheet material W is mechanically made to have a predetermined curvature. Simultaneously, since the uppermost group of multiple sheet materials W are in contact with inclined surfaces 18*a* and 18*a*, the caused curvature of the uppermost sheet material W is the largest, and the caused curvature of each sheet material in contact with inclined surfaces 18*a* and 18*a* is reduced stepwise with respect to the curvature of another sheet material immediately above the each sheet material.

The configuration that the sheet materials W in contact with inclined surfaces 18*a* and 18*a* are set to have curvatures projecting upward, serves to separate at least a central portion of each sheet material W from each other, and thereby ensures a space therebetween.

Therefore, when sheet materials W are taken out from sheet material stocker 3A or 3B by the suction and support of vacuum pads 12 of transfer head 11, the sheet materials W can be reliably taken out one by one, and double take-out of sheet materials can be prevented.

Additionally, when attention is focused only on prevention of double take-out of sheet materials W, air may be blown from the outside to the space between sheet materials W of the uppermost group as needed, in parallel with causing the curvatures of the sheet materials W of the uppermost group in sheet material stocker 3A, 3B.

As mentioned above, at the later adhesive agent application stages S2 and S4, the adhesive agent is applied to the sheet materials W which are taken out one by one from sheet material stocker 3A or 3B. The setting the sheet materials W to have curvatures projecting upward before sheet materials W are taken out from sheet material stocker 3A or 3B, is found to contribute also to improving the quality of adhesive agent application to sheet materials W.

More specifically, provided that the uppermost one of the stacked multiple sheet materials W is taken out sequentially, wherein sheet materials W are made of resin, each sheet material W is mutually tightly contacted with another sheet material W due to an upper load under a condition that sheet materials W are stacked, but each sheet material W has some warpage which is not uniform. Thereby, when sheet materials W are taken out one by one, and supplied to the adhesive agent application operation which is implemented by application gun 6, dispersion occurs in the quality of adhesive agent application due to the warpage of each sheet material W. This limits the improvement and stabilization of the quality of adhesive agent application.

In contrast, in the present embodiment, sheet materials W are curved to have predetermined curvatures in advance, and the adhesive agent application operation to both obverse and reverse sides of sheet material W is assumed to be completed before the curvature of sheet material W is restored to an original condition due to its own restoring force. As long as the forcibly caused curvature of sheet material W remains, the warpage of sheet material W is temporarily corrected so that the curvature of sheet material W is substantially uniform and stable.

Accordingly, the adhesive agent application operation may be performed with setting the condition of adhesive agent application at adhesive agent application stages S2 and S4 shown in FIG. 1 based on the assumption that each sheet material W has the predetermined curvature. This serves to improve and stabilize the quality of adhesive agent application to sheet materials W.

When the adhesive agent application operation is performed at adhesive agent application stage S4 following the adhesive agent application stage S2, the sheet material W is in the reversed state as mentioned above, so that the adhesive agent application operation at adhesive agent application stage S4 is under a condition that the curvature of sheet material W has a caused curvature projecting downward.

the present embodiment is described above with reference to a sheet material as an example, which is used as an insulation sheet, when multiple cells are accommodated in a metallic hard case, and modularized to form a module of a lithium-ion secondary battery, wherein each cell has a thin laminated structure. However, this is merely one example, and naturally, the present invention can be also applied to other kinds of sheet material made of resin or different material.

The invention claimed is:

1. A sheet material adhesive agent application method comprising:
   performing a first action including applying an adhesive agent to a sheet material; and
   performing a second action in advance of the first action, wherein the second action includes setting the sheet material curved such that the sheet material has a predetermined non-zero curvature; and
   wherein the first action is completed before the sheet material is restored to a state before the second action; and wherein the first action is implemented by spraying the adhesive agent on the sheet material by an application gun.

2. The sheet material adhesive agent application method as claimed in claim 1, wherein the first action is performed sequentially for stacked multiple sheet materials, wherein the first action is implemented by:
- taking out an uppermost one of the multiple sheet materials;
- transferring the taken-out sheet material to an adhesive agent application stage; and
- applying the adhesive agent to the transferred sheet material at the adhesive agent application stage.

3. The sheet material adhesive agent application method as claimed in claim 2, wherein the second action is implemented by setting an uppermost group of sheet materials of the multiple sheet materials such that each sheet material of the uppermost group has a curvature projecting upward when the multiple sheet materials are stacked, wherein the uppermost group includes the uppermost sheet material.

4. The sheet material adhesive agent application method as claimed in claim 3, wherein the second action is implemented such that the curvature of each sheet material of the uppermost group is greater than that of another sheet material immediately below the each sheet material when the multiple sheet materials are stacked.

5. The sheet material adhesive agent application method as claimed in claim 4, wherein the second action is implemented such that each sheet material of the uppermost group includes a central portion out of contact with a central portion of each other.

6. The sheet material adhesive agent application method as claimed in claim 3, wherein the second action is implemented such that each sheet material of the uppermost group includes a central portion out of contact with a central portion of each other.

7. A sheet material adhesive agent application method comprising:
- performing a first action including applying an adhesive agent to a sheet material; and
- performing a second action in advance of the first action, wherein the second action includes setting the sheet material such that the sheet material has a predetermined curvature; and
- wherein the first action is completed before the sheet material is restored to a state before the second action, and
- wherein the second action is implemented by setting an uppermost group of sheet materials of multiple sheet materials such that each sheet material of the uppermost group has a curvature projecting upward when the multiple sheet materials are stacked, wherein the uppermost group includes an uppermost sheet material.

8. The sheet material adhesive agent application method as claimed in claim 7, wherein the second action is implemented such that the curvature of each sheet material of the uppermost group is greater than that of another sheet material immediately below the each sheet material when the multiple sheet materials are stacked.

9. The sheet material adhesive agent application method as claimed in claim 7, wherein the second action is implemented such that each sheet material of the uppermost group includes a central portion out of contact with a central portion of each other.

10. The sheet material adhesive agent application method as claimed in claim 8, wherein the second action is implemented such that each sheet material of the uppermost group includes a central portion out of contact with a central portion of each other.

\* \* \* \* \*